United States Patent [19]
Costa

[11] Patent Number: 6,027,154
[45] Date of Patent: Feb. 22, 2000

[54] REMOTELY REMOVABLE SNAP HOOK

[75] Inventor: Ronald Edward Costa, Mesquite, Tex.

[73] Assignee: Ceiling Lift Corporation, Mesquite, Tex.

[21] Appl. No.: 09/146,430

[22] Filed: Sep. 3, 1998

[51] Int. Cl.[7] ...................................................... B66C 1/36
[52] U.S. Cl. .................... 294/82.21; 294/19.1; 24/599.5; 24/600.2
[58] Field of Search ................................ 294/19.1, 82.19, 294/82.2, 82.21, 82.31, 82.33, 82.34; 24/599.1, 599.4, 599.5, 599.9, 600.2

[56] References Cited

U.S. PATENT DOCUMENTS

| | | | |
|---|---|---|---|
| 1,281,336 | 10/1918 | Frazier, Jr. ............................. | 294/19.1 |
| 1,626,865 | 5/1927 | Neilson ................................... | 294/82.2 |
| 2,116,880 | 5/1938 | Dee . | |
| 2,246,630 | 6/1941 | Johnson . | |
| 3,436,795 | 4/1969 | Hill ........................................ | 294/82.34 |
| 3,913,515 | 10/1975 | Hernsjo et al. . | |
| 4,195,872 | 4/1980 | Skaalen et al. . | |
| 5,490,293 | 2/1996 | Nilsson . | |
| 5,538,303 | 7/1996 | Dunham . | |
| 5,622,399 | 4/1997 | Albright . | |
| 5,820,181 | 10/1998 | Le Noach ............................. | 294/82.19 |

FOREIGN PATENT DOCUMENTS

| | | | |
|---|---|---|---|
| 3347-725 | 7/1985 | Germany ............................... | 24/600.1 |

OTHER PUBLICATIONS

Sure Hands Lift & Care Systems Track–to–Track 100, Product Brochure, Copyright 1998.

Ceiling Track System, Lift Mate, Product Brochure (Date Unknown).

Waverly Glen Systems Ltd., H410–N Transportable Reacher, specification sheet, revision Oct. 1998.

Gaper–Universal Patient Lift System, Waverly Glenn Product Brochure (Date Unknown).

*Primary Examiner*—Dean J. Kramer
*Attorney, Agent, or Firm*—Akin, Gump, Strauss, Hauer & Feld, L.L.P.

[57] ABSTRACT

An improved snap hook with a latch that can be remotely moved to an open position by use of a shaft. The shaft is inserted into the snap hook at an angle so that it will not interfere with a load depending from the snap hook. When the shaft is inserted into a channel on the snap hook, the shaft engages a member adapted to open the latch. When the shaft is removed from the channel, the latch returns to a closed position.

18 Claims, 2 Drawing Sheets

REMOTELY REMOVABLE SNAP HOOK

FIELD OF THE INVENTION

The present invention relates to snap hooks, and in particular relates to an improved remotely removable snap hook for use in a Ceiling Mounted Transport System used to transport non-ambulatory persons.

BACKGROUND OF THE INVENTION

Snap hooks have a latch that is movable between an open and a closed position, and when in the closed position, the latch bridges the open end or throat of the hook. When it is desired to connect the snap hook to a support device, the latch is moved to the open position to provide an entry clearance through the open end of the hook for the support device. After the snap hook is installed, the latch is moved back into the closed position to minimize the possibility that the snap hook will be accidentally disconnected from the support device.

Ceiling Mounted Transport Systems ("CMTS's") utilize overhead tracks that are oftentimes positioned at the internal ceiling of a structure such as a nursing home or warehouse. These systems include a roller mounted plate attached to the track that can roll back and forth to desired locations along the length of the track. A support device such as a U-shaped bar depends downward from the rolling plate and is used to support a hoist, which in turn is used to support and lift a load. CMTS's are particularly advantageous for transporting non-ambulatory persons, because the system is capable of lifting the disabled person above obstacles commonly found in environments such as homes, nursing homes, and hospitals. A typical CMTS hoist includes a strap or chain that can extend out of and retract into the body of the hoist, and the upper end of the strap has a snap hook for connecting to the support device depending from the rolling plate. A harness or other support device depends from the lower surface of the hoist and is secured to the load, which is lifted by operating the hoist to retract the upper strap into the body of the hoist. Some CMTS's use portable hoists, i.e., hoists that can be disconnected from one CMTS and relocated for use on a CMTS at a different location. The advantage of using a portable hoist is that it reduces the overall cost of operating multiple CMTS's.

Portability is particularly desirable in CMTS's used for transporting non-ambulatory disabled persons (i.e., "non-ambulatory CMTS's"). Given the frequency with which a hoist is used in a non-ambulatory CMTS as well as the need to curtail the costs associated with medical care, it is not always cost effective to have a dedicated hoist at each CMTS administered by a caregiver tending to the needs of the disabled. Thus, any advances in the art that will enhance the portability of a CMTS hoist is highly desirable, and particularly so when the hoist under consideration is used in non-ambulatory CMTS's.

To remove a portable hoist from the rolling platform in a typical non-ambulatory CMTS, the operator first lowers the hoist onto a platform or the floor to relieve the load placed on the snap hook by the weight of the hoist. Locating and positioning a platform beneath the hoist is inconvenient and lowering the hoist to the floor is undesirable since the operator is exposed to potential back injuries when later lifting the hoist from the floor. Moreover, since hoists used in non-ambulatory CMTS's are usually lightweight enough to be hand carried, this step could be eliminated altogether if a means existed for disconnecting the snap hook from the rolling platform while the operator manually supports the weight of the hoist.

After the weight of the hoist is removed from the snap hook, a person of typical height must use a step ladder, stool, etc., to access the snap hook to move the latch into the open position. The use of a stepladder or stool is undesirable, since the operator may fall when disconnecting the snap hook. The possibility of a fall is aggravated by the fact that, while standing on the step ladder, the operator must devote his or her attention to moving the latch into the open position so that the snap hook can be disconnected from the roller plate.

A CMTS device known in the art that eliminates the need for a step ladder uses a shaft or pole that is permanently attached to a hook that is connected to the roller platform. The shaft depends downward from the hook far enough for an operator who is standing on the floor to grasp the shaft and remove the hook from the roller platform. However, since the shaft is permanently attached to the hook, it moves with the platform from one position on the track to another and may thus interfere with obstacles lying in the same path as the track. Additionally, the hooks attached to the angled shafts do not include a latch—the purpose of using an angled shaft would be defeated if the hook included a latch, since the operator would need a stepladder to access the hook to open the latch.

An example of a snap hook with a detachable shaft is shown in U.S. Pat. No. 3,913,515 to Hernsjo. However, while the shaft in Hernsjo is useful for installing a snap hook onto a support member, the shaft does not include a means for opening the latch. Consequently, the operator must still access the snap hook with his or her hands to open the latch, when disconnecting the snap hook.

Snap hooks with remotely operable latches are known in the art. For example, in U.S. Pat. No. 4,195,872 to Skaalen, the latch is opened by a pulling on a tether line that extends through the body of the hook. A similar snap hook is disclosed in U.S. Pat. No. 5,538,303 to Dunham. However, while these tether lines allow an operator to open the latch from a remote position, they do not provide a safe and controllable means of removing the snap hook from an overhead support device. U.S. Pat. No. 2,246,630 to Johnson discloses a snap hook for connecting to electric power lines having a latch that is opened by a lever operated camming mechanism, and the lever includes an eyelet to which a tether line might be attached. However, this device includes moving parts positioned external to the body of the hook, including above the top of the hook, which could interfere with the mounting of a snap hook to a roller platform in a CMTS. Moreover, hooks with external moving parts are undesirable in many applications because of the possibility of entanglement in clothing, furniture, and medical equipment.

U.S. Pat. Nos. 2,116,880 to Dee and 5,622,399 to Albright disclose snap hooks that use a shaft to remotely operate the latch, and the shaft also serves as a handle for removing the snap hook from a support device. However, the motion of the shaft when opening the latch in these hooks is parallel with the line supporting the load connected to the snap hook. Consequently, if the shaft is used while the snap hook is suspending a hoist, there is a potential for interference between the shaft and the hoist. Moreover, the shaft is detached from the hook by rotating the shaft, and the shaft may be accidentally disconnected if the shaft is inadvertently rotated.

Another patent of general interest is U.S. Pat. No. 5,490,293, which discloses an apparatus used to transfer a hoist from one track in a CMTS to an adjacent track. This apparatus does not address the portability needs encountered when the hoist must be moved from one location (e.g., nursing home) to another location (e.g., private home).

From the foregoing, it is seen that it is highly desirable to have a snap hook, particularly for use in connection with portable hoists used in non-ambulatory CMTS's, with a simpler, more compact, and more streamlined construction than prior art snap hooks. It is also desirable to have a snap hook with a latch that is remotely operable by a shaft while the hoist is suspended from the hook. Such a snap hook will allow an operator to remotely open the latch, and then remove the snap hook from a support device while the operator is simultaneously supporting the weight of the hoist, and will eliminate the inherent danger involved in using a stepladder to access the snap hook to open the latch.

SUMMARY OF THE INVENTION

The present invention provides a simplified snap hook for attaching to a first support device and supporting a load applied to the snap hook by a second support device, that is adapted to be remotely removable from the first support device by a shaft. The term "remotely removable" as used herein means that the snap hook can be removed by an operator who is positioned at a remote distance from the snap hook, and who is unable to access the hook with his or her bare hands from the remote position.

The safety hook includes a hook portion formed by a shank, a bight, and a tine. The shank and the tine are spaced from each other to define a gap therebetween at an open end of the hook portion. The bight is positioned at the closed end of the hook portion and includes a bight surface that is adapted to cooperate with the first support device in a first load bearing relationship. In other words, any loads suspended from the snap hook will be transmitted into the first support device by the bight surface.

The shank includes a base portion having a base support surface and an elongated channel with a central axis formed in said base portion. The base support surface is adapted to cooperate with the second support device wherein the second support device transmits a load carried by the second support device into the base support surface in a predetermined direction. The channel is positioned in the base portion with the central axis extending away from the predetermined direction of the load at a shaft angle of greater than 0° with respect to the predetermined direction of the load applied to the base support surface.

A moveable latch is connected to the hook portion at an attachment point adjacent the upper surface of the shank and adjacent the open end of the hook portion. The latch is normally spring biased into a closed position where the latch extends from the attachment point substantially across the gap, and is movable to an open position where the latch extends from the attachment point substantially towards the closed end of the hook portion. A member is supported on the hook portion that is engageable with the latch, and a portion of the member extends into the channel when the latch is in the closed position. The elongated channel is adapted to receive an insertion end of the shaft and position the shaft in alignment with the central axis and in engagement with the member to move the latch into the open position.

According to another aspect of the invention, the snap hook is adapted to be operable by means of a shaft having a handle and an actuator tip extending from the insertion end of the handle. The actuator tip has a smaller cross section area than the handle and is engageable with the member supported on the base portion to open the safety latch. The channel includes a major channel portion adapted to receive and position the handle in substantial alignment with the central axis, and a minor portion adapted to receive and position the actuator tip in engagement with the portion of the member extending into the channel.

According to another aspect of the invention, the the portion of the member that extends into the channel is adapted to be engaged by a camming surface on the actuator tip.

According to another aspect of the invention, means are provided for detachably connecting the shaft to the snap hook without having to rotate the shaft, when the insertion end of the shaft is inserted into the elongated channel.

According to another aspect of the invention, a snap hook is provided having a shaft angle that is between about 0° and less than about 45°.

According to another aspect of the invention, the member supported on the base portion is a longitudinally extending rod mounted in the base portion for reciprocal movement along its longitudinal axis. A first end of the rod extends into the channel for engagement with the shaft and a second end of the rod is positioned adjacent the latch to engage the latch and move the latch into the open position.

According to another aspect of the invention, the latch is pivotally connected to the attachment point, with a closure length extending across the gap when the hook is in the open position, and towards the closed end when in the open position. A lower length of the latch is positioned on the opposite side of the attachment point, and is adapted for engagement by the member supported on the hook to move the latch into the open position.

DESCRIPTION OF THE PREFERRED EMBODIMENT

Figure 1:
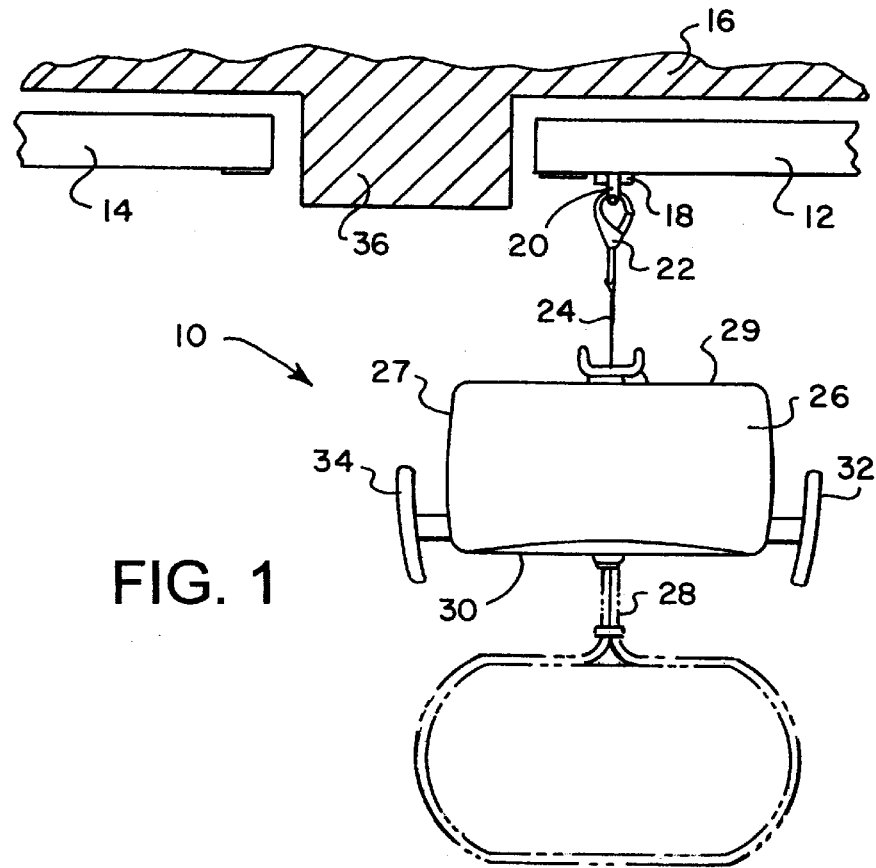
FIG. 1 is an elevation showing a Ceiling Mounted Transport System utilizing the snap hook of the invention.

A typical non-ambulatory CMTS (10) is shown in FIG. 1. As used herein, the term non-ambulatory CMTS refers to a Ceiling Mounted Transport System that is used to transport disabled persons. In such a system, tracks (12) and (14) are mounted to the ceiling (16) and are provided with a roller mounted plate (18) which can roll back and forth along the length of the track to desired locations. A first support device (20) such as a U-shaped bar depends downward from the roller plate (18) to provide a connecting point for a snap hook (22). A second support device (24) such as a strap or chain is attached to and depends downward from the snap hook (22) and extends into the body of a hoist (26). While the weight of the hoist can vary depending upon the lifting application, a hoist used in a non-ambulatory CMTS will typically be light enough to be hand carried by the CMTS operator. An example of a hoist used in a non-ambulatory CMTS is the DH-1000, marketed by V. Guldmann A/S of Denmark, which weighs about 11.5 Kg, and has a height (27) of about 260 mm, a length (29) of about 450 mm, and a width (not shown) of about 150 mm. A third support device (28) such as a harness depends downward from a lower surface (30) on the hoist (26) for connection to a load such as a disabled person (not shown).

After the load is connected to the harness, the hoist is operated by AC or DC power to retract the strap (24) into the body of the hoist (26) and lift the load. After the load is lifted to a desired height, the operator applies pressure to the handles (32) and (34) on the hoist to move the roller plate (18), hoist (26), and load to a new location on the track (12). CMTS's are also available which utilize an electric motor to accomplish such movement. Once the new location is reached, the load is lowered by operating the hoist to allow the upper strap (24) to extend out of the hoist.

FIG. 1 illustrates that the track may be interrupted by a structure (36) depending from the ceiling (16), as might be found at a doorway leading from one room in a home to the next. To move the hoist (26) from track (12) to track (14), the snap hook (22) must be disconnected from the roller plate (18) and relocated to a second roller plate (not shown) on track (14). In many circumstances, it may be desired to remove the hoist (26) from track (12) and move the hoist to a different location altogether.

Figure 2:
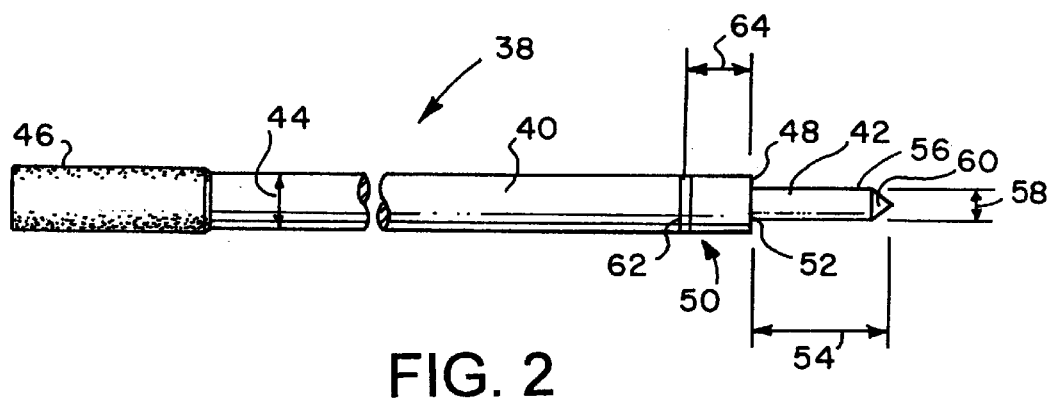
FIG. 2 is a side elevation of a shaft used to remotely operate the preferred embodiment snap hook.

According to the preferred embodiment of the invention, the snap hook (22) is removed from the first support device (20) by means of a shaft (38) as shown in FIG. 2. The haft (38) comprises a handle (40) with a circular cross section area (not shown) and an actuator tip (42) with a circular cross section area (not shown). The diameter (44) of the handle is selected to be comfortable and easy to grasp by the operator and may include a grip (46).

The actuator tip (42) is concentrically mounted to a flush surface (48) at an insertion end (50) of the shaft (38). The actuator tip (42) has a proximate end (52) at the flush surface (48) and a length (54) extending from the proximate end (52) to distal end (56). The actuator tip diameter (58) and cross section area are smaller than those of the handle (44), and the distal end (56) includes a conical camming surface (60) for communicating with a latch on the snap hook as hereafter described. A circumferential groove (62) is provided on the handle (40) near the insertion end (50) a distance (64) from the flush surface (48). The handle diameter (44) and the location and dimensions of the circumferential groove (62) are adapted to mate with and detachably connect to the snap hook (22) as hereafter described.

Figures 3, 4:
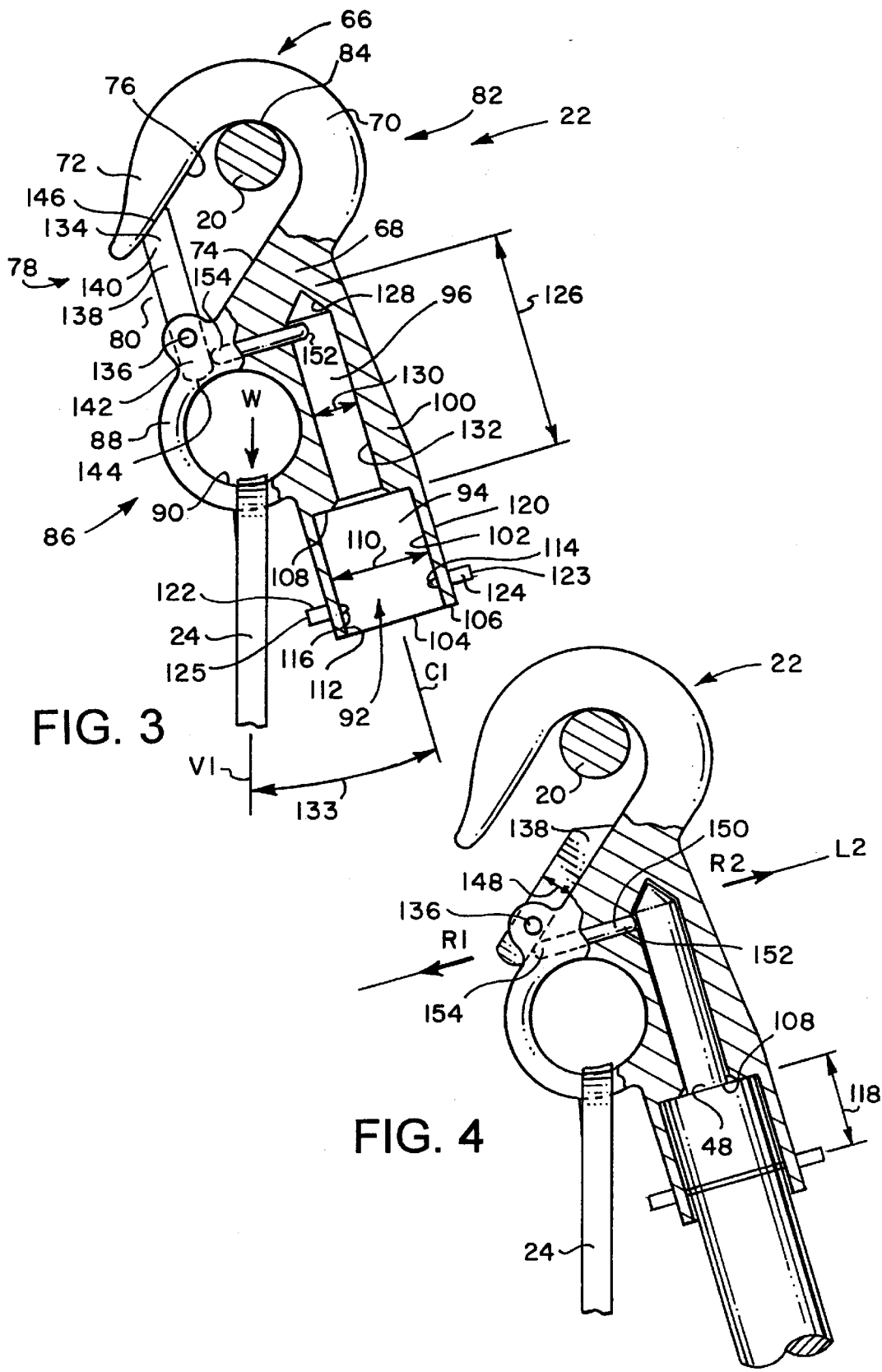
FIG. 3 is an elevation, partially sectioned showing a preferred embodiment of a snap hook in the installed condition, with the latch in a closed position.
FIG. 4 is an elevation similar to FIG. 3 showing the preferred embodiment snap hook in the installed condition, with the shaft inserted into the channel and the latch in the open position.

FIG. 3 shows the snap hook (22) connected to the first support device (20). The snap hook (22) includes a hook portion (66) which is integrally formed from a shank (68), a bight (70), and a tine (72). The upper surface (74) of the shank (68) is spaced from the lower surface (76) of the tine (72) to define an open end (78) of the hook portion (66) with a gap (80) sized to accommodate the first support device (20). The bight (70) is at a closed end (82) of the hook portion (66) and includes a bight surface (84) adapted to cooperate with the first support device (20) in a first load bearing relationship where loads suspended from the snap hook are transmitted into the first support device by the bight surface.

The shank (68) includes a base portion (86) that forms a ring or eyelet (88) adapted to connect to the second support device (24) (i.e., the strap that is retractable into and extendable out of the hoist). The second support device or strap (24) connects to the eyelet (88) at a base support surface (90). The base support surface (90) is adapted to cooperate with the strap (24) in a second load bearing relationship, in which the strap (24) applies a load (W) to the base support surface in a predetermined direction.

The load applied to the base support surface (90) by the strap (24) will typically be a gravitational load, and thus the predetermined direction of the load applied to the base support surface (90) will typically be straight down in the direction of a vertical axis (V1) extending from the snap hook to the floor (not shown). The materials and dimensions of the hook portion (66) are selected to ensure that the snap hook (22) will support the weight of the hoist (26) and any load connected to the hoist. In the preferred embodiment, hook portion (66) is an integral unit made of steel.

The base portion (86) forms an elongated channel (92) with a central axis C1 within the internal volume (100) of the base portion (86) that is adapted to mate with the shaft (38). A major channel portion (94) has a length (102) that extends from a channel opening (104) on an external surface (106) of the base portion (86) to an intermediate shoulder surface (108) as measured along the central axis (C1). The major portion has a diameter (110) that is slightly larger than the diameter (44) of the handle (40). The major channel portion also has a major channel wall (112) that supports and positions the shaft (38) such that the shaft is aligned with the central axis C1 when the shaft is inserted into the channel (92).

A pair of oppositely disposed spring loaded detent balls (114) and (116) extend into the major channel portion (94) through the major channel wall (112). The detent balls are positioned a distance (118) from the intermediate shoulder surface (108), which corresponds to the distance (64) that the circumferential groove (62) is positioned from flush surface (48) of the handle(40). The springs (not shown) are mounted on the external major wall (120) in the screw mounts (122) and (124) and engage the detent balls to bias them into the major channel portion. A pair of screws (not shown) are installed into the screw mounts through ends (123) and (125) and engage the springs. The force that the springs exert against the detent balls can thus be adjusted to a desired level by turning the screws to vary the compression of the springs bearing against the detent balls.

It should be noted that the detent balls (114) and (116) and screw mounts (122) and (124) are shown in the locations depicted in FIGS. 3 and 4 for illustration purposes only. In the preferred embodiment, these oppositely disposed items are rotated to positions 90° from the positions shown in FIGS. 3 and 4, with respect to the central axis C1. The positions of these items in the preferred embodiment will facilitate the adjustment of the screws when the snap hook is in the installed condition by minimizing interference with the strap (24) and roller plate (18).

An alternate detachment means comprising an internal C-ring (not shown) may be used in lieu of the detent balls to detachably connect the shaft (38) to the snap hook (22). The C-ring is located in the major channel wall (112) at the same length (118) from the intermediate shoulder surface (108) as the detent balls (114) and (116). The C-ring depends into the circumferential groove (62) when the shaft (38) is installed into the elongated channel (92) to retain the shaft in the channel. The insertion end (50) and circumferential groove (62) are both configured as necessary to spread the c-ring as the shaft (38) is inserted into or retracted from the channel (92). Whether the detent balls or C-ring is used, both approaches provide a means for detachably retaining the shaft (38) in the channel (92) that does not rely on having to rotate the shaft to engage or disengage the locking mechanisms.

The minor channel portion (96) has a minor length (126) corresponding to the length (54) of the actuator tip (42), extending in the direction of central axis C1 from the intermediate shoulder surface (108) to a channel end surface (128). Channel end surface (128) is tapered in a manner complimentary to the conical end (60) of the actuator tip (42), and the minor diameter (130) is slightly larger than the diameter (58) of the actuator tip (42). Thus, the minor channel portion (96) has a substantially uniform circular cross section area adapted to receive the actuator tip (42) The minor channel portion (96) also has a minor channel wall (132) that supports and positions the actuator tip (42) to align the tip with the central axis C1 when the tip is inserted into the minor channel portion (96).

The major and minor channel portions (94) and (96) are each positioned within the volume (100) of the base portion (86) to lie along and extend in the direction of the central axis (C1) to define an overall channel length (135) between channel opening (104) and channel end surface (128). While the channel end surface (128) is preferably located and shaped as shown in FIGS. 3 and 4, the elongated channel (92) could extend entirely through the base portion, so that the channel end surface coincides with the shank's upper surface (74).

The central axis C1 is oriented at a shaft angle (133) with respect to the predetermined direction of the load (W) that is applied to the base support surface (90). The shaft angle (133) may be selected to be any value which will permit the shaft (38) to be inserted into the channel (92) without interfering with the hoist (26) or other load depending from the snap hook (22). In most applications the shaft angle (133) will be greater than 0° and less than 45°, and in the preferred embodiment is approximately 16°.

A latch (134) is pivotally connected to the hook portion at an attachment point (136) located adjacent the shank's upper surface (74) and adjacent the hook portion's open end (78), and is pivotal between the closed position shown in FIG. 3 and the open position shown in FIG. 4. As shown in FIG. 3, the latch (134) has a closure length (138) extending from the attachment point (136) across the gap (80) to a closure end (140). The latch (134) also has a lower length (142) that extends in the opposite direction from the attachment point (136) to a lower end (144).

The closure end (140) includes a slanted surface (146) which rests against the tine's lower surface (76) when the latch (134) is in the closed position shown in FIG. 3. When the latch (134) is in the open position shown in FIG. 4, the closure length (138) lies flush against the shank upper surface (74) and extends from the attachment point (136) towards the closed end (82) of the hook portion (66). The thickness (148) of the latch is selected as necessary to permit the first support device (20) to pass between the latch (134) and the tine's lower surface (76) when the latch is in the open position. A spring (not shown) normally biases the latch (134) into the closed position.

The lower length (142) of latch (138) communicates with the shaft (38) by means of a member comprising a longitudinally extending rod (150) positioned in the base portion (86) as shown in FIG. 3. The rod (150) has a pair of oppositely disposed first and second ends (152) and (154), with the first end (152) positioned in the minor channel portion (96) when the latch (134) is in the open position and the second end (154) positioned adjacent the lower end (144) of the latch (134).

The rod (150) is mounted in the base portion (86) so that it may move in reciprocal directions RI and R2 along its longitudinal axis (Li) shown in FIG. 4. The rod's first end (152) is adapted to be engageable with the camming surface (60) when the shaft (38) is inserted into the channel (92). The first end (152) responds to the engagement from the camming surface (60) by moving the rod (150) in a first linear reciprocal direction Ri that is towards the lower length (142) and at a right angle to the central axis C1. The rod's second end (154) engages the latch's lower length (142) when moving in the first direction (Ri) to rotate the latch (134) about the attachment point (136) and into the open position.

The operation of remotely removing the snap hook from a support device will now be described with reference to FIGS. 1, 3 and 4. In FIG. 3 the snap hook (22) is shown installed on a first support device (20). Preferably, any load that was attached to the harness (28) depending from the hoist (26) is removed, so that the second support device (24) (i.e., strap) is supporting only the weight of the hoist (26). Since the weight of the hoist (26) is a gravitational load, the predetermined direction of the load applied by the strap to the base support surface (90) is vertical or directly downward. In FIG. 3, the shaft (38) has not yet been inserted into the channel (92). Consequently, the latch (134) is in the closed position and the rod's first end (152) is located in the minor channel portion.

The shaft (38) is shown installed into the channel (92) in FIG. 4. To install the shaft (38), the insertion end (50) of the shaft (38) is inserted into the channel (92) through the channel opening (104), and the major and minor channel walls (112) and (132) position and support the handle (40) and actuator tip (42) at the shaft angle (133) so that the handle (40) will not physically interfere with the hoist (26). As the shaft moves into the fully installed position shown in FIG. 4, the minor channel wall (132) supports and positions the camming surface (60) of the actuator tip (42) to engage the rod's first end (152). The first end (152) responds to this communication from the actuator tip (42) by moving the rod (150) in the first reciprocal direction (Rl) along its longitudinal axis (L1). This movement forces the rod's second end (154) to engage the latch's lower length (142). The lower length (142) responds to this communication from the shaft (38), via rod (150), by rotating the latch (134) into the open position shown in FIG. 4.

As the insertion end (50) of the handle (40) moves through the major channel portion (94), the flush surface (48) engages the spring loaded detent balls (114) and (116) and forces them out of the channel to permit the full entry of the handle's insertion end (50). When the flush surface (48) engages the intermediate shoulder surface (108), the detent balls (114) and (116) (not shown in FIG. 4) extend back into the channel and depend into the circumferential groove (62) to retain the shaft (38) in the channel (92), without having to rotate the shaft relative to the central axis C1. The screws in the screw mounts (122) and (124) may be adjusted to vary the spring load against the balls to provide the desired level of force necessary to insert the shaft (38) into the channel (92) while the snap hook is suspending the weight of the hoist or other loads.

With the snap hook (22) locked into the open position shown in FIG. 4, the operator can manually support the weight of the hoist (26) and remove the snap hook (22) from the first support device (20) by using the shaft (38). After the snap hook (22) is installed on another support device at another location, the shaft (38) is removed from the channel (92) by pulling it out without any need of rotating the shaft, allowing the latch (134) to be biased back into the closed position. As the latch moves back into the closed position, the latch's lower length (142) engages the rod's second end (154) to push the rod (150) in a second reciprocal direction (122) along its longitudinal axis (Li) and reposition the first end (152) back into the minor channel portion (96).

While the preferred embodiments of the claims have been described, it should be understood that various changes, adaptions, and modifications may be made therein without departing from the spirit of the invention and the scope of the appended claims.

What is claimed is:

1. A snap hook for attaching to a first support device and for supporting a load applied to the snap hook by a second support device, adapted to be remotely removed from the first support device by a shaft, the shaft having a handle with an actuator tip extending from an insertion end of the handle, wherein a handle cross section area is larger than an actuator tip cross section area comprising:
   a. a shank, a bight, and a tine forming a hook portion, said shank and said tine spaced from each other to define a gap therebetween at an open end of said hook portion, said bight having a bight surface at a closed end of said hook portion adapted to cooperate with the first support device in a load bearing relationship;
   b. said shank including a base portion having a base support surface and an elongated channel formed in said base portion with a central axis, said base support surface adapted to cooperate with the second support device wherein the second support device applies a load to said base support surface in a predetermined direction, and wherein said elongated channel extends in a direction away from said predetermined direction of said load at a shaft angle greater than zero degrees with respect to the predetermined direction of the load applied to said base support surface;
   c. a latch moveably connected to said hook at an attachment point adjacent an upper surface of said shank and adjacent said open end, said latch normally being biased into a closed position wherein said latch extends from said attachment point substantially across the gap, and is moveable to an open position wherein said latch extends from said attachment point substantially towards said closed end;
   d. a member supported on said hook and engageable with said latch, said member including a portion extending into said elongated channel when said latch is in the closed position; and
   e. said elongated channel having an intermediate shoulder surface and a major channel portion and a minor channel portion positioned on opposite sides of said intermediate shoulder surface;
   f. said major channel portion extending from a channel opening on an external surface of said base portion to said intermediate shoulder surface and adapted to receive and support the insertion end of the handle in substantial alignment with the central axis; and
   g. said minor channel portion is adapted to receive the actuator tip and position the actuator tip in engagement with said portion of said member extending into said channel.

2. A snap hook as claimed in claim 1 wherein said portion extending into said channel is adapted to be engageable with a camming surface on the actuator tip.

3. A snap hook as claimed in claim 2, including means for detachably connecting the shaft to said hook portion when the insertion end of the shaft is installed into said channel.

4. A snap hook as claimed in claim 2, wherein the shaft angle is less than about forty five degrees.

5. A snap hook as claimed in claim 2, wherein said member comprises a longitudinally extending rod mounted on said base portion for reciprocal movement along a longitudinal axis, having a first end extending into said channel and a second end positioned adjacent said latch.

6. A snap hook as claimed in claim 1 including means for detachably connecting the shaft to said hook portion when the insertion end of the shaft is installed into said channel.

7. A snap hook as claimed in claim 1 wherein the shaft angle is less than about forty five degrees.

8. A snap hook for attaching to a first support device and for supporting a load applied to the snap hook by a second support device, adapted to be remotely removed from the first support device by a shaft, comprising:
   a. a shank, a bight, and a tine forming a hook portion, said shank and said tine spaced from each other to define a gap therebetween at an open end of said hook portion, said bight having a bight surface at a closed end of said hook portion adapted to cooperate with the first support device in a load bearing relationship;
   b. said shank including a base portion having a base support surface and an elongated channel formed in said base portion with a central axis, said base support surface adapted to cooperate with the second support device wherein the second support device applies a load to said base support surface in a predetermined direction, and wherein said elongated channel extends in a direction away from said predetermined direction of said load at a shaft angle greater than zero degrees with respect to the predetermined direction of the load applied to said base support surface;
   c. a latch pivotally connected to said hook portion at an attachment point adjacent an upper surface of said shank and adjacent said open end, wherein said latch has a closure length and a lower length positioned on opposite sides of said attachment point, wherein said closure length extends from said attachment point substantially across the gap when said latch is in a closed position and substantially towards said closed end when said latch is an open position, and wherein said latch is normally biased into the closed position;
   d. a longitudinally extending member supported on said hook for reciprocal movement along a longitudinal axis extending substantially perpendicular to the central axis, having a first end extending into said channel when said latch is in the closed position and a second end positioned adjacent and adapted to engage said lower length; and
   e. said channel adapted to receive an insertion end of the shaft and position the shaft in substantial alignment with the central axis and in engagement with said member to move said latch into the open position.

9. A snap hook as claimed in claim 8, wherein said portion extending into said channel is adapted to be engageable with a camming surface on the insertion end.

10. A snap hook as claimed in claim 9, including means for detachably connecting the shaft to said hook portion when the insertion end of the shaft is installed into said channel.

11. A snap hook as claimed in claim 9, wherein the shaft angle is less than about forty five degrees.

12. A snap hook as claimed in claim 8, including means for detachably connecting the shaft to said hook portion when the insertion end of the shaft is installed into said channel.

13. A snap hook as claimed in claim 8, wherein the shaft angle is less than about forty five degrees.

14. A snap hook for attaching to a first support device and for supporting a load applied to the snap hook by a second support device, adapted to be remotely removed from the first support device by a shaft having a handle and further having an actuator tip extending from an insertion end of the handle, the handle having a larger cross sectional area than the the actuator tip cross section area, comprising:
   a. a shank, a bight, and a tine forming a hook portion, said shank and said tine spaced from each other to define a gap therebetween at an open end of said hook portion, said bight having a bight surface at a closed end of said hook portion adapted to cooperate with the first support device in a load bearing relationship;
   b. said shank including a base portion having a base support surface and an elongated channel formed in said base portion with a central axis, said base support surface adapted to cooperate with the second support device wherein the second support device applies a load to said base support surface in a predetermined direction, and wherein said elongated channel extends in a direction away from said predetermined direction of said load at a shaft angle greater than zero degrees with respect to the predetermined direction of the load applied to said base support surface;
   c. a latch pivotally connected to said hook portion at an attachment point adjacent an upper surface of said shank and adjacent said open end, wherein said latch has a closure length and a lower length positioned on opposite sides of said attachment point, wherein said closure length extends from said attachment point substantially across the gap when said latch is in a closed position and substantially towards said closed end when said latch is in the open position, and wherein said latch is normally biased into the closed position;
   d. said elongated channel has an intermediate shoulder surface and a major channel portion and a minor channel portion positioned on opposite sides of said intermediate shoulder surface, wherein said major channel portion extends from a channel opening on an external surface of said base portion to said intermediate shoulder surface and is adapted to receive the insertion end and position the handle in substantial alignment with the central axis;
   d. a member supported on said hook and engageable with said lower length, said member including a portion extending into said minor channel portion when said latch is in the closed position; and
   e. said minor channel portion is adapted to receive the actuator tip and position the actuator tip in engagement with said member to move said latch into the open position.

15. A snap hook as claimed in claim 14, wherein said portion extending into said minor channel portion is adapted to be engaged by a camming surface on the actuator tip.

16. A snap hook as claimed in claim 15, including means for detachably connecting the shaft to said hook portion when the insertion end of the shaft is installed into said channel.

17. A snap hook as claimed in claim 15, wherein said member comprises a longitudinally extending rod mounted on said base portion for reciprocal movement along a longitudinal axis, having a first end extending into said minor channel portion and a second end positioned adjacent said lower length.

18. A snap hook as claimed in claim 15, wherein the shaft angle is less than about forty five degrees.

* * * * *